(12) United States Patent
Whittle et al.

(10) Patent No.: US 11,773,735 B2
(45) Date of Patent: Oct. 3, 2023

(54) VANE RING ASSEMBLY WITH CERAMIC MATRIX COMPOSITE AIRFOILS

(71) Applicant: Rolls-Royce plc, London (GB)

(72) Inventors: Michael J. Whittle, Derby (GB); Daniel Clark, Derby (GB); Carl Boettcher, Nottingham (GB); David Wright, Loughborough (GB)

(73) Assignee: Rolls-Royce plc

( * ) Notice: Subject to any disclaimer, the term of this patent is extended or adjusted under 35 U.S.C. 154(b) by 0 days.

(21) Appl. No.: 17/560,202

(22) Filed: Dec. 22, 2021

(65) Prior Publication Data

US 2023/0193769 A1 Jun. 22, 2023

(51) Int. Cl.
*F01D 9/04* (2006.01)
*F01D 25/00* (2006.01)

(52) U.S. Cl.
CPC .......... *F01D 9/041* (2013.01); *F01D 25/005* (2013.01); *F05D 2220/32* (2013.01); *F05D 2230/60* (2013.01); *F05D 2240/12* (2013.01); *F05D 2300/20* (2013.01)

(58) Field of Classification Search
CPC .......... F01D 9/041; F01D 9/042; F01D 5/284; F01D 5/282; F01D 25/005; F01D 9/065; F01D 5/189; F01D 11/005; F01D 5/18; F01D 5/188; F01D 9/02; F01D 25/24; F01D 25/246; F01D 9/047; F01D 17/162; F01D 25/243; F01D 25/28; F01D 5/147; F01D 9/00; F01D 9/04; F01D 5/3023; F05D 2300/6033; F05D 2240/12; F05D 2260/201; F05D 2230/60; F05D 2260/30; F05D 2240/128; F05D 2230/642; F05D 2220/32; F05D 2260/22141; F05D 2240/80; F05D 2260/941; F05D 2300/603; F05D 2300/20; F05D 2240/126; F05D 2240/81; F05D 2250/12; F05D 2250/121; F05D 2240/14; F05D 2260/31; F02C 7/20; F04D 29/322; F04D 29/666; F04D 29/544
See application file for complete search history.

(56) References Cited

U.S. PATENT DOCUMENTS

| | | | |
|---|---|---|---|
| 4,396,349 | A | 8/1983 | Hueber |
| 5,740,674 | A | 4/1998 | Beutin et al. |
| 5,931,636 | A | 8/1999 | Savage et al. |
| 6,183,192 | B1 | 2/2001 | Tressler et al. |
| 8,007,229 | B2 | 8/2011 | McCaffrey et al. |
| 8,133,011 | B2 | 3/2012 | Cortequisse |
| 8,454,303 | B2 | 6/2013 | Garcia-Crespo |
| 8,454,304 | B2 | 6/2013 | Heriz Agiriano et al. |

(Continued)

*Primary Examiner* — Eric J Zamora Alvarez
(74) *Attorney, Agent, or Firm* — Barnes & Thornburg LLP

(57) ABSTRACT

A turbine vane assembly for use in a gas turbine engine includes turbine vanes, a segmented inner vane support, and an outer vane support. The turbine vanes are arranged around a central axis of the engine. The inner vane support is arranged radially inwardly of the turbine vanes. The outer vane support includes a full-hoop outer support ring located radially outward of the plurality of turbine vanes and extends entirely circumferentially about the central axis. The outer vane support further includes a plurality of discrete support spars coupled to the full-hoop outer support ring and extending radially inward from the full-hoop outer support ring through an interior cavity of a respective turbine vane.

18 Claims, 9 Drawing Sheets

(56) References Cited

U.S. PATENT DOCUMENTS

| | | | |
|---|---|---|---|
| 9,784,133 B2 | 10/2017 | Karafillis et al. | |
| 9,840,923 B2 | 12/2017 | Batt et al. | |
| 9,915,159 B2 | 3/2018 | Huizenga et al. | |
| 10,072,516 B2 | 9/2018 | Carr et al. | |
| 10,202,857 B2 | 2/2019 | Simonds et al. | |
| 10,309,240 B2 | 6/2019 | Heitman et al. | |
| 10,337,404 B2 | 7/2019 | McMahan et al. | |
| 10,767,493 B2 | 9/2020 | Whittle et al. | |
| 10,767,497 B2 | 9/2020 | Vetters et al. | |
| 10,774,665 B2 | 9/2020 | Greene et al. | |
| 10,883,376 B2 | 1/2021 | Whittle et al. | |
| 10,961,857 B2 | 3/2021 | Whittle et al. | |
| 11,047,247 B2 | 6/2021 | Whittle et al. | |
| 11,066,944 B2 | 7/2021 | Urac et al. | |
| 11,073,039 B1 | 7/2021 | Whittle et al. | |
| 11,519,280 B1* | 12/2022 | Bainbridge | F01D 5/282 |
| 2014/0212284 A1 | 7/2014 | Jamison et al. | |
| 2016/0123165 A1* | 5/2016 | McCaffrey | F01D 9/02 415/115 |
| 2016/0130960 A1 | 5/2016 | Cortequisse | |
| 2016/0146040 A1 | 5/2016 | Simpson et al. | |
| 2017/0204734 A1* | 7/2017 | Groves, II | F01D 9/065 |
| 2021/0108524 A1 | 4/2021 | Whittle et al. | |
| 2021/0123352 A1* | 4/2021 | Townes | B33Y 80/00 |
| 2021/0231024 A1* | 7/2021 | Whittle | F01D 11/08 |

* cited by examiner

VANE RING ASSEMBLY WITH CERAMIC MATRIX COMPOSITE AIRFOILS

FIELD OF THE DISCLOSURE

The present disclosure relates generally to gas turbine engines, and more specifically to turbine vane assemblies for use with gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Products of the combustion reaction directed into the turbine are conducted toward airfoils included in stationary vanes and rotating blades of the turbine. The airfoils are often made from high-temperature resistant materials and/or are actively cooled by supplying relatively cool air to the vanes and blades due to the high temperatures of the combustion products. To this end, some airfoils for vanes and blades are incorporating composite materials adapted to withstand very high temperatures. Design and manufacture of vanes and blades from composite materials presents challenges because of the geometry and strength desired for the parts.

SUMMARY

The present disclosure may comprise one or more of the following features and combinations thereof.

A turbine vane assembly for use in a gas turbine engine according to the present disclosure includes a plurality of turbine vanes, a segmented inner vane support, and an outer vane support. The plurality of turbine vanes are comprised of ceramic matrix composite materials and are adapted to interact with hot gases flowing through a gas path of the gas turbine engine during use of the turbine vane assembly in the gas turbine engine. The plurality of turbine vanes are arranged around an axis of the gas turbine engine. Each turbine vane of the plurality of turbine vanes is spaced apart circumferentially from an adjacent turbine vane included in the plurality of turbine vanes relative to the axis.

In some embodiments, the segmented inner vane support is comprised of metallic materials, is arranged radially inwardly of the plurality of turbine vanes, and extends partway circumferentially about the axis. The segmented inner vane support is configured to receive force loads applied to the plurality of turbine vanes by the hot gases during use of the turbine vane assembly in the gas turbine engine.

In some embodiments, the outer vane support is comprised of metallic materials and configured to receive force loads applied to the plurality of turbine vanes by the hot gases during use of the turbine vane assembly in the gas turbine engine. The outer vane support includes a full-hoop outer support ring located radially outward of the plurality of turbine vanes so as to locate the plurality of turbine vanes radially between the segmented inner vane support and the full-hoop outer support ring. The full-hoop outer support ring extends entirely circumferentially about the axis. The outer vane support further includes a plurality of discrete support spars coupled to the full-hoop outer support ring and extending radially inward from the full-hoop outer support ring through an interior cavity of a respective turbine vane of the plurality of turbine vanes.

In some embodiments, the full-hoop outer support ring includes an annular outer mount platform extending entirely circumferentially about the axis and a plurality of spar-receiving openings formed in the annular outer mount platform. Each spar-receiving opening of the plurality of spar-receiving openings opens axially through the annular outer mount platform. Each discrete support spar of the plurality of discrete support spars is arranged within a respective spar-receiving opening of the plurality of spar-receiving openings.

In some embodiments, each discrete support spar of the plurality of discrete support spars includes a radially inner end, a radially outer end, and a strut extending between and interconnecting the radially inner end and the radially outer end, the radially outer end including an outer spar platform.

In some embodiments, the outer spar platform of each discrete support spar of the plurality of discrete support spars extends away from an outer surface of the strut in a circumferential direction and in an axial direction so as to form an overhang around an entirety of the strut.

In some embodiments, each spar-receiving opening of the plurality of spar-receiving openings is shaped to correspond to an outer contour of an upper portion of the strut of a respective discrete support spar of the plurality of discrete support spars such that at least a portion of a radially inwardly facing surface of the outer spar platform contacts a radially outwardly facing surface of the annular outer mount platform of the full-hoop outer support ring.

In some embodiments, the inner vane support includes an inner mount platform extending partway circumferentially about the axis and including at least two raised interface surfaces extending radially outward from the inner mount platform and engaging at least two respective discrete support spars of the plurality of discrete support spars to block radial movement of the inner mount relative to the outer vane support.

In some embodiments, the inner vane support further includes at least two fasteners configured to couple a respective inner end of a respective discrete support spar of the plurality of discrete support spars to the inner mount to provide a mechanical linkage between the at least two respective discrete support spars and reduce twisting of the turbine vane assembly during use of the turbine vane assembly in the gas turbine engine.

In some embodiments, the outer spar platform of each discrete support spar of the plurality of discrete support spars includes a first outer edge and a second outer edge that are axially spaced apart and extend in the circumferential direction and a third outer edge and a fourth outer edge that are circumferentially spaced apart and extend in the axial direction. The first outer edge and the second outer edge are parallel with each other. The third outer edge and the fourth outer edge are parallel with each other. The third outer edge of the outer spar platform of each discrete support spar circumferentially abuts the fourth outer edge of the outer spar platform of an adjacent discrete support spar.

In some embodiments, the outer spar platform of each discrete support spar of the plurality of discrete support spars includes a substantially planar radially outwardly facing surface and a substantially planar radially inwardly facing surface that each correspond to the circumferential radius of curvature of the annular outer mount platform of the full-hoop outer support ring such that the radially inwardly facing surface lies flush with the a radially outwardly facing surface of the annular outer mount platform.

In some embodiments, the outer spar platform of each discrete support spar of the plurality of discrete support spars further includes a plurality of ribs extending upwardly away from the outer spar platform, each rib of the plurality of ribs including a central portion having a constant height and angled ends that extend away from the central portion to an outer perimeter of the outer spar platform.

In some embodiments, the plurality of ribs includes a first rib and a second rib that are axially spaced apart and extend in a circumferential direction and a third rib and a fourth rib that are circumferentially spaced apart and extend in an axial direction.

In some embodiments, the first rib and the second rib are parallel with each other, and wherein the third rib and the fourth rib are parallel with each other.

In some embodiments, the outer spar platform of each discrete support spar of the plurality of discrete support spars further includes a plurality of fastener holes formed therein. The annular outer mount platform of the full-hoop outer support ring further includes a plurality of fastener holes formed therein that are aligned with the plurality of fastener holes of the outer spar platform of each discrete support spar. A fastener is arranged within each fastener hole of the outer spar platform and the annular outer mount platform so as to couple the discrete support spar to the full-hoop outer support ring.

A turbine vane assembly for use in a gas turbine engine according to another aspect of the present disclosure includes a plurality of turbine vanes arranged around a central axis of the gas turbine engine, an inner vane support arranged radially inwardly of the plurality of turbine vanes and extending circumferentially about the central axis, and an outer vane support.

In some embodiments, the outer vane support includes a full-hoop outer support ring located radially outward of the plurality of turbine vanes so as to locate the plurality of turbine vanes radially between the inner vane support and the full-hoop outer support ring. The full-hoop outer support ring extends entirely circumferentially about the central axis. The outer vane support further includes a plurality of discrete support spars coupled to the full-hoop outer support ring and extending radially inward from the full-hoop outer support ring through an interior cavity of a respective turbine vane of the plurality of turbine vanes.

In some embodiments, the full-hoop outer support ring includes an annular outer mount platform extending entirely circumferentially about the central axis and a plurality of spar-receiving openings formed in the annular outer mount platform. Each spar-receiving opening of the plurality of spar-receiving openings opens axially through the annular outer mount platform. Each discrete support spar of the plurality of discrete support spars is arranged within a respective spar-receiving opening of the plurality of spar-receiving openings.

In some embodiments, each discrete support spar of the plurality of discrete support spars includes a radially inner end, a radially outer end, and a strut extending between and interconnecting the radially inner end and the radially outer end, the radially outer end including an outer spar platform.

In some embodiments, the outer spar platform of each discrete support spar of the plurality of discrete support spars extends away from an outer surface of the strut in a circumferential direction and in an axial direction so as to form an overhang around an entirety of the strut.

In some embodiments, each spar-receiving opening of the plurality of spar-receiving openings is shaped to correspond to an outer contour of an upper portion of the strut of a respective discrete support spar of the plurality of discrete support spars such that at least a portion of a radially inwardly facing surface of the outer spar platform contacts a radially outwardly facing surface of the annular outer mount platform of the full-hoop outer support ring.

A method according to another aspect of the present disclosure includes providing a plurality of turbine vanes comprised of ceramic matrix composite materials and adapted to interact with hot gases flowing through a gas path of a gas turbine engine during use of the gas turbine engine, arranging the plurality of turbine vanes around an axis of the gas turbine engine, wherein each turbine vane of the plurality of turbine vanes is spaced apart circumferentially from an adjacent turbine vane relative to the axis, and providing a segmented inner vane support comprised of metallic materials, arranged radially inwardly of the plurality of turbine vanes, and extending partway circumferentially about the axis, the segmented inner vane support configured to receive force loads applied to the plurality of turbine vanes by the hot gases during use of the gas turbine engine.

In some embodiments, the method further includes providing an outer vane support comprised of metallic materials and configured to receive force loads applied to the plurality of turbine vanes by the hot gases during use of the gas turbine engine, the outer vane support including a full-hoop outer support ring and a plurality of discrete support spars, arranging the full-hoop outer support ring radially outward of the plurality of turbine vanes so as to locate the plurality of turbine vanes radially between the segmented inner vane support and the full-hoop outer support ring, the full-hoop outer support ring extending entirely circumferentially about the axis, inserting each discrete support spar of the plurality of discrete support spars through an interior cavity of a respective turbine vane of the plurality of turbine vanes, and coupling each discrete support spar to the full-hoop outer support ring such that each discrete support spar extends radially inward from the full-hoop outer support ring through the interior cavity of a respective turbine vane.

In some embodiments, the full-hoop outer support ring includes an annular outer mount platform extending entirely circumferentially about the axis and a plurality of spar-receiving openings formed in the annular outer mount platform. Each spar-receiving opening of the plurality of spar-receiving openings opens axially through the annular outer mount platform. Each discrete support spar of the plurality of discrete support spars is arranged within a respective spar-receiving opening of the plurality of spar-receiving openings. Each discrete support spar of the plurality of discrete support spars includes a radially inner end, a radially outer end, and a strut extending between and interconnecting the radially inner end and the radially outer end, the radially outer end including an outer spar platform.

These and other features of the present disclosure will become more apparent from the following description of the illustrative embodiments.

DETAILED DESCRIPTION OF THE DRAWINGS

Figure 1:
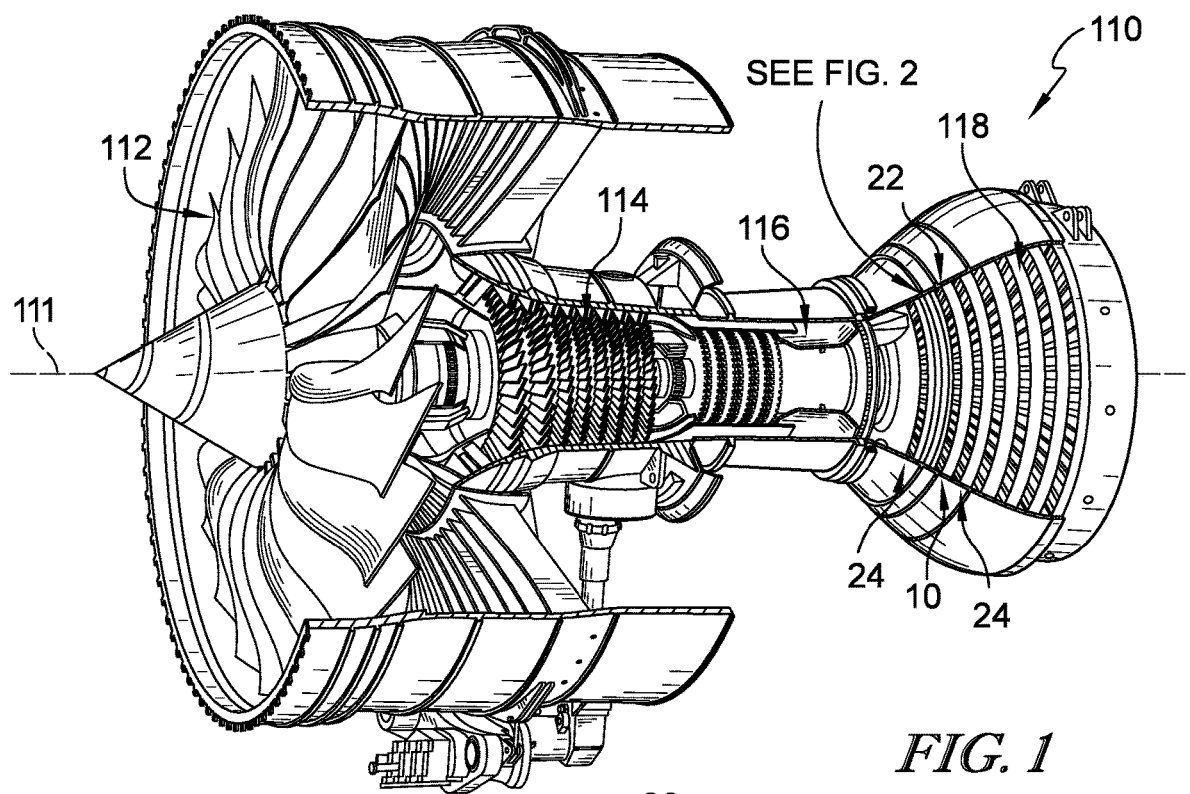
FIG. 1 is a cutaway view of a gas turbine engine that includes a fan, a compressor, a combustor, and a turbine, the turbine including rotating wheel assemblies configured to rotate about an axis of the engine and static turbine vane rings configured to direct air into downstream rotating wheel assemblies.

For the purposes of promoting an understanding of the principles of the disclosure, reference will now be made to a number of illustrative embodiments illustrated in the drawings and specific language will be used to describe the same.

Figure 2:
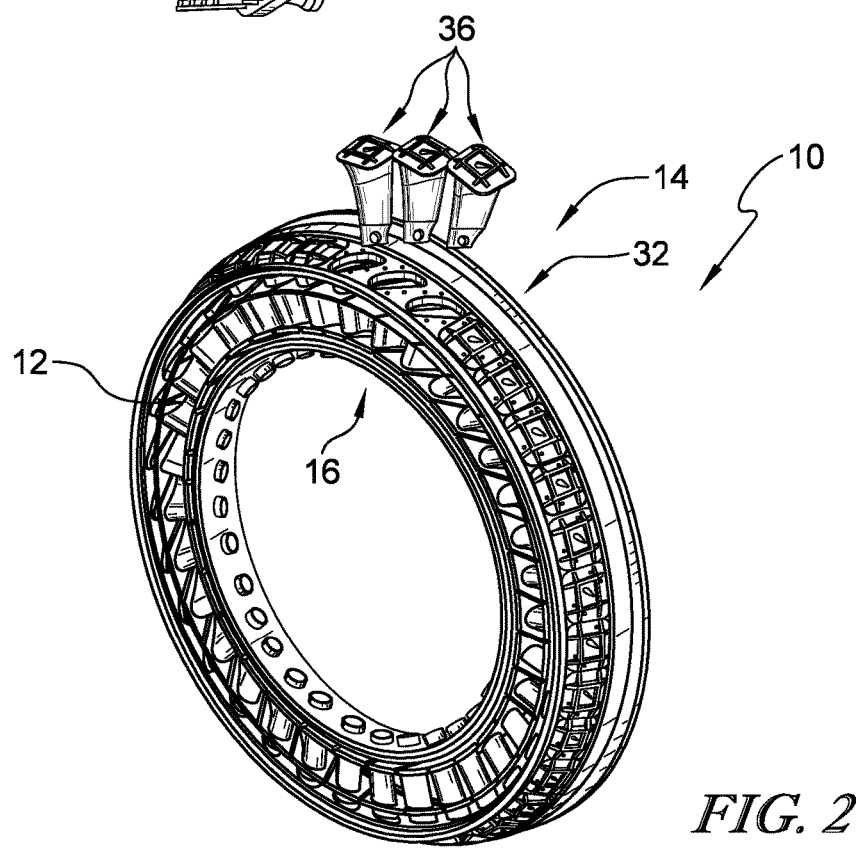
FIG. 2 is a perspective view of a turbine vane assembly of a static turbine vane ring shown in FIG. 1 showing that the turbine vane assembly includes a full-hoop outer support ring, a plurality of turbine vanes adapted to interact with hot gases flowing through a gas path of the gas turbine engine, a segmented inner vane support ring arranged radially inward of the turbine vanes and the full-hoop outer support ring, and a plurality of discrete support spars that extend radially inward from the full-hoop outer support ring through a corresponding turbine vane and couple to the segmented inner vane support ring.

A turbine vane assembly 10 for use in a gas turbine engine 110 is shown in FIG. 2. The turbine vane assembly 10 includes a plurality of turbine vanes 12, an outer vane support 14, and an inner vane support 16 as shown in FIGS. 2-5. The turbine vanes 12 each interact with hot gases conducted through a gas path 18 of the gas turbine engine 110 and conducts the hot gases around the turbine vane assembly 10 toward a rotating wheel assembly 24 located downstream of the turbine vane assembly 10 as suggested in FIG. 6. The outer vane support 14 is located radially outward of and extends radially into the turbine vanes 12 and is configured to receive force loads applied to the vanes 12 by the hot gases. The inner vane support 16 is spaced apart radially from the outer support 14 relative to the axis to locate the plurality of turbine vanes 12 radially therebetween. The inner vane support 16 is coupled with the outer vane support 14 to provide a mechanical linkage between the plurality of turbine vanes 12 and reduce twisting of the turbine vane assembly 10 relative to adjacent turbine vane assemblies during use of the turbine vane assembly 10 in the gas turbine engine 110.

The vanes 12 comprise ceramic matrix composite materials, while the outer and inner vane supports 14, 16 comprise metallic materials in the illustrative embodiment. As such, the ceramic matrix composite vanes 12 are adapted to withstand high temperatures, but may have relatively low strength compared to the metallic vane supports 14, 16. The vane supports 14, 16 provide structural strength to the turbine vane assembly 10 by receiving the force loads applied to the vanes 12 and transferring them to a casing 20 that surrounds the turbine vane assembly 10.

The turbine vane assembly 10 is adapted for use in the gas turbine engine 110, which includes a fan 112, a compressor 114, a combustor 116, and a turbine 118 as shown in FIG. 1. The fan 112 is driven by the turbine 118 and provides thrust for propelling an aircraft. The compressor 114 compresses and delivers air to the combustor 116. The combustor 116 mixes fuel with the compressed air received from the compressor 114 and ignites the fuel. The hot, high pressure products of the combustion reaction in the combustor 116 are directed into the turbine 118 to cause the turbine 118 to rotate about an axis 111 of the gas turbine engine 110 and drive the compressor 114 and the fan 112. In other embodiments, the fan 112 may be omitted and the turbine 118 drives a propeller, drive shaft, or other suitable alternative.

Figure 6:
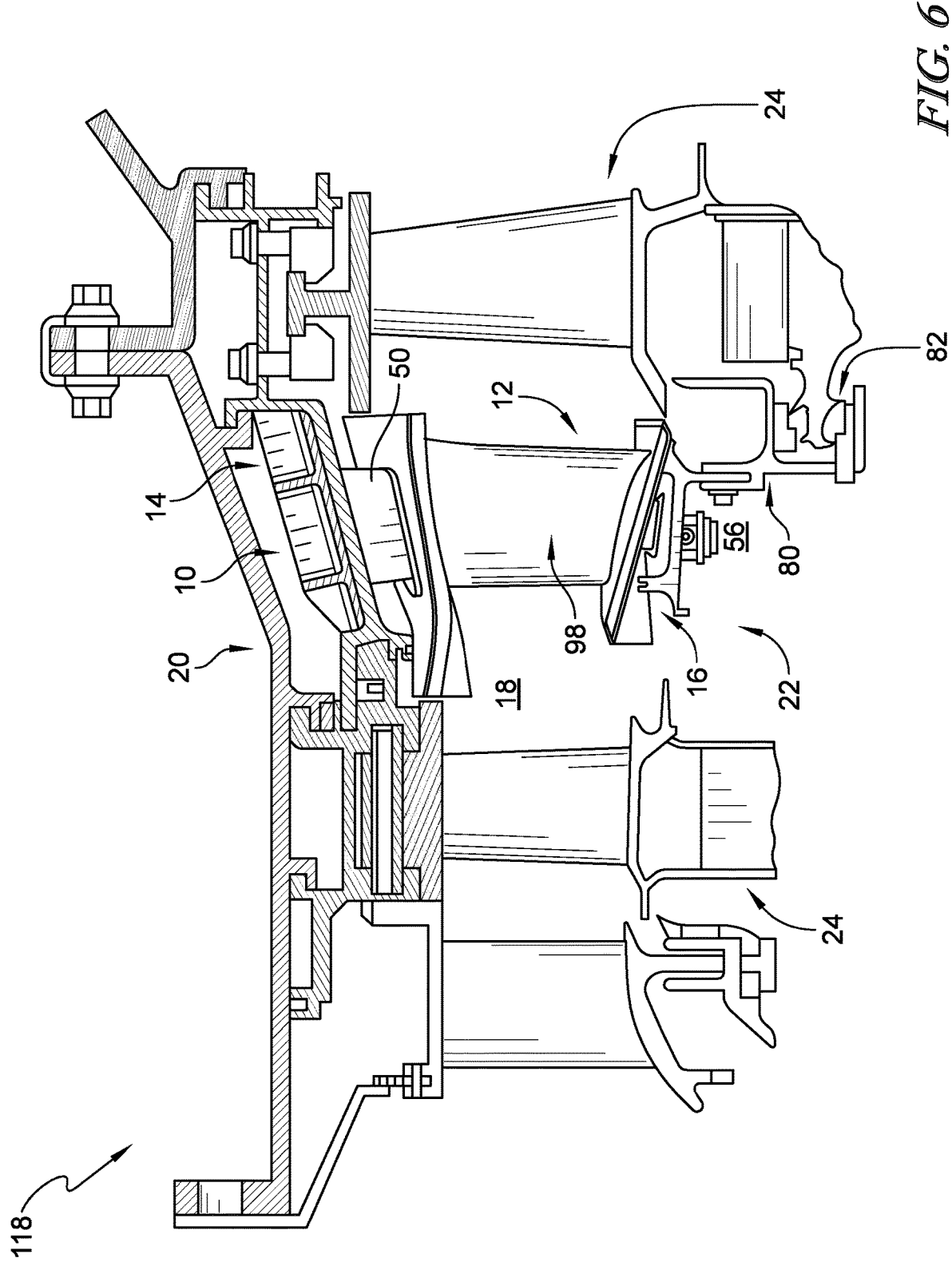
FIG. 6 is a section view of a portion of the turbine included in the gas turbine engine of FIG. 1 showing the turbine vane assembly and portion of the turbine casing and rotating wheel assemblies.

The turbine 118 includes a turbine case 20, a plurality of static turbine vane rings 22 that are fixed relative to the axis 111, and a plurality of bladed rotating wheel assemblies 24 as suggested in FIGS. 1 and 6. Each turbine vane ring 22 includes a plurality of turbine vane assemblies 10. The hot gases are conducted through the gas path 18 and interact with the bladed wheel assemblies 24 to cause the bladed wheel assemblies 24 to rotate about the axis 111. The turbine vane rings 22 are positioned to direct the gases toward the bladed wheel assemblies 24 with a desired orientation.

The hot gas conducted through the gas path 18 of the gas turbine engine 110 is prone to leaking out of the gas path 18 and through small spaces and gaps between components of the turbine vane ring 22, such as the vane assembly 10 and the outer and inner vane supports 14, 16. To minimize leaking, in particular radially outward of the vane assembly 10, the outer vane support 14 includes a full-hoop outer support ring 32 and individual, discrete support spars 36 arranged around the entirety of the full-hoop outer support ring 32. As a result of the use of a full-hoop outer support ring 32 along with discrete support spars 36, hot gas flowing through the gas path 18 is unable to escape because no spaces or gaps are present in the full-hoop outer support ring 32 of the outer vane support 14. As such, overall leakage of the engine 110 is reduced, and thus overall engine 110 performance is increased. Moreover, the full-hoop outer support ring 32 provides increased robustness and stiffness to the overall vane assembly 10.

Figure 3:
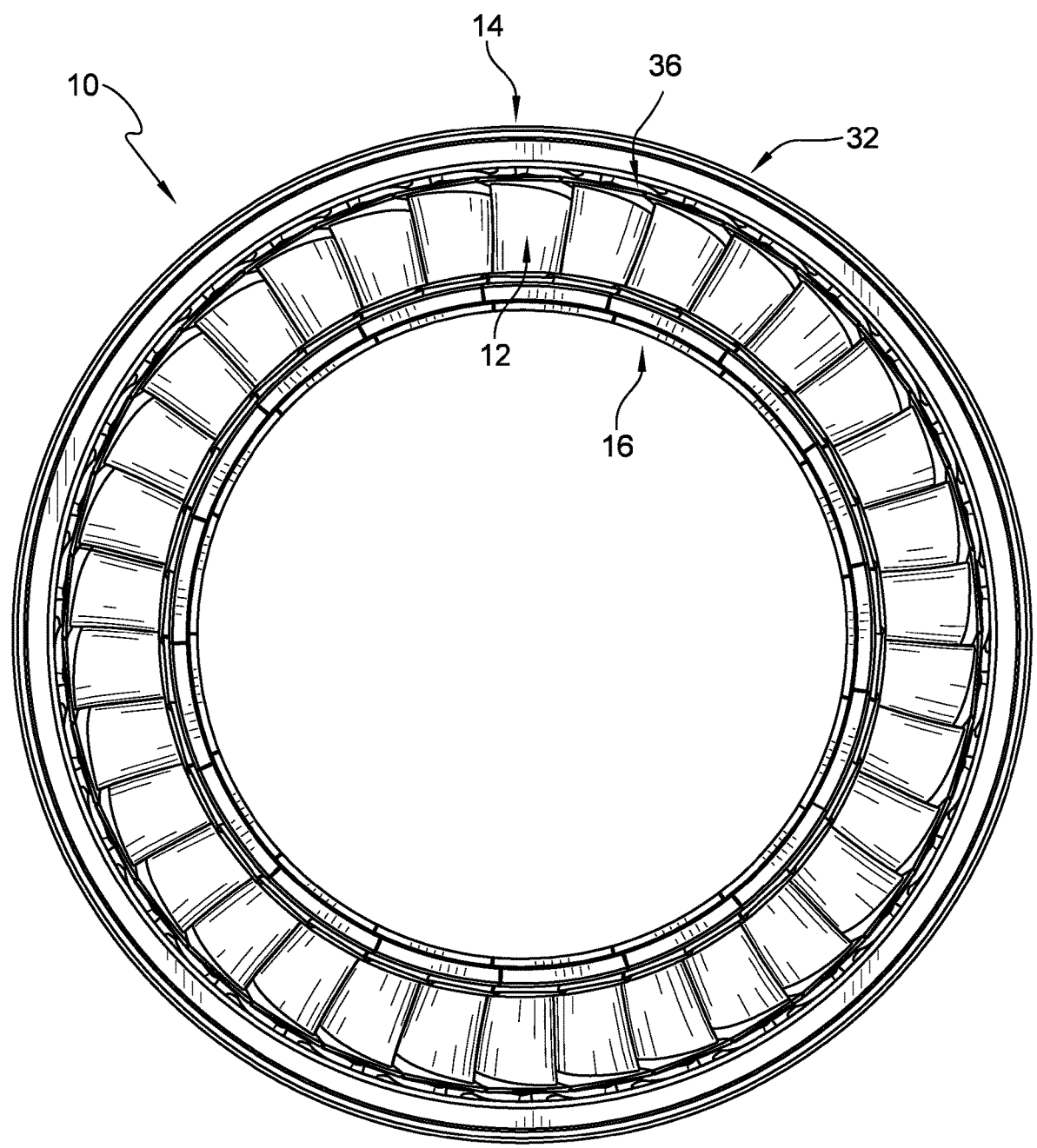
FIG. 3 is a front view of the turbine vane assembly of FIG. 2 showing that the turbine vane assembly includes the full-hoop outer support ring, the plurality of turbine vanes that extend entirely around the full-hoop outer support ring, and the segmented inner vane support ring arranged radially inward of the turbine vanes and the full-hoop outer support ring.
Figure 4:
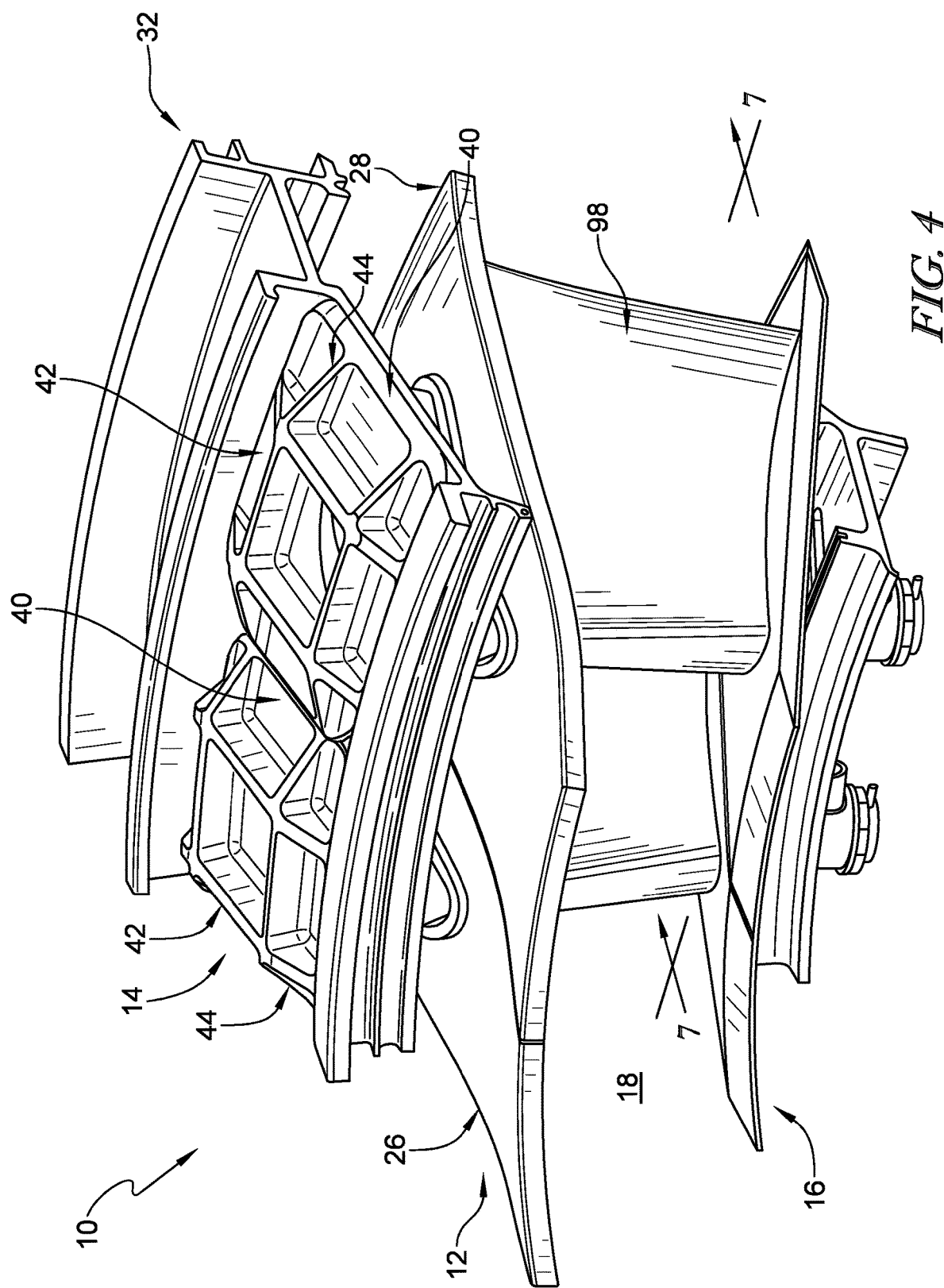
FIG. 4 is a perspective view of a section of the turbine vane assembly of FIG. 2 showing two turbine vanes of the plurality of turbine vanes, a section of the full-hoop outer support ring, an inner mount of the segmented inner vane support ring that extends partway around the axis and that is arranged radially inward of the turbine vanes and the full-hoop outer support ring, and two discrete support spars of the plurality of discrete support spars that extend radially inward from the full-hoop outer support ring through a corresponding turbine vane and couple to the segment of the segmented inner vane support ring.
Figure 5:
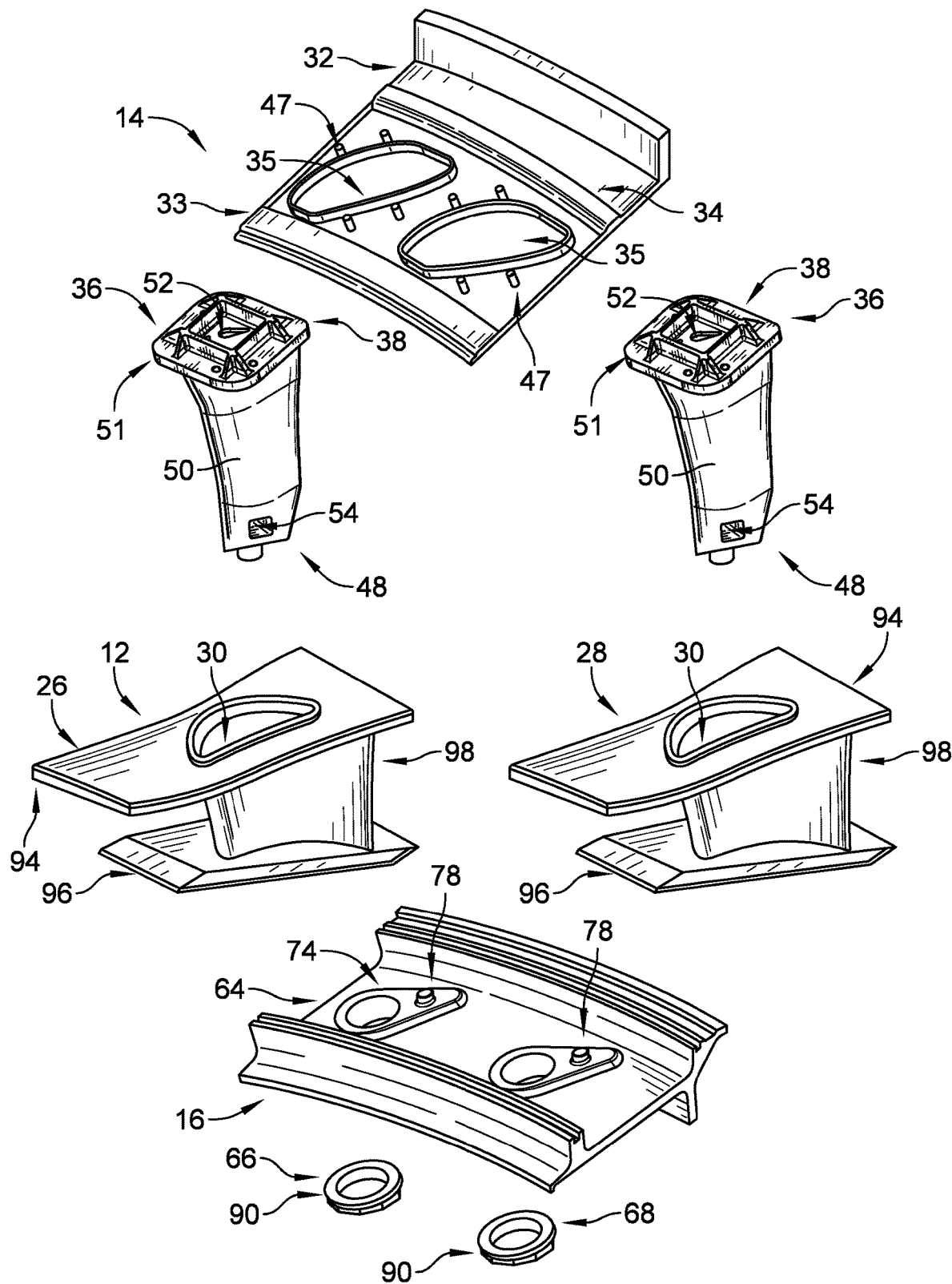
FIG. 5 is an exploded view of the turbine vane assembly of FIG. 4 showing two turbine vanes of the plurality of turbine vanes, the section of the full-hoop outer support ring, the segment of the segmented inner vane support ring, and the full-hoop outer support ring, and two discrete support spars of the plurality of discrete support spars that extend radially inward from the full-hoop outer support ring through a corresponding turbine vane and couple to the segment of the segmented inner vane support ring, and further showing inner mount of the segmented inner vane support and a plurality of fasteners configured to couple one of the support spars to the inner mount and form a mechanical linkage between the plurality of turbine vanes.
Figure 7:
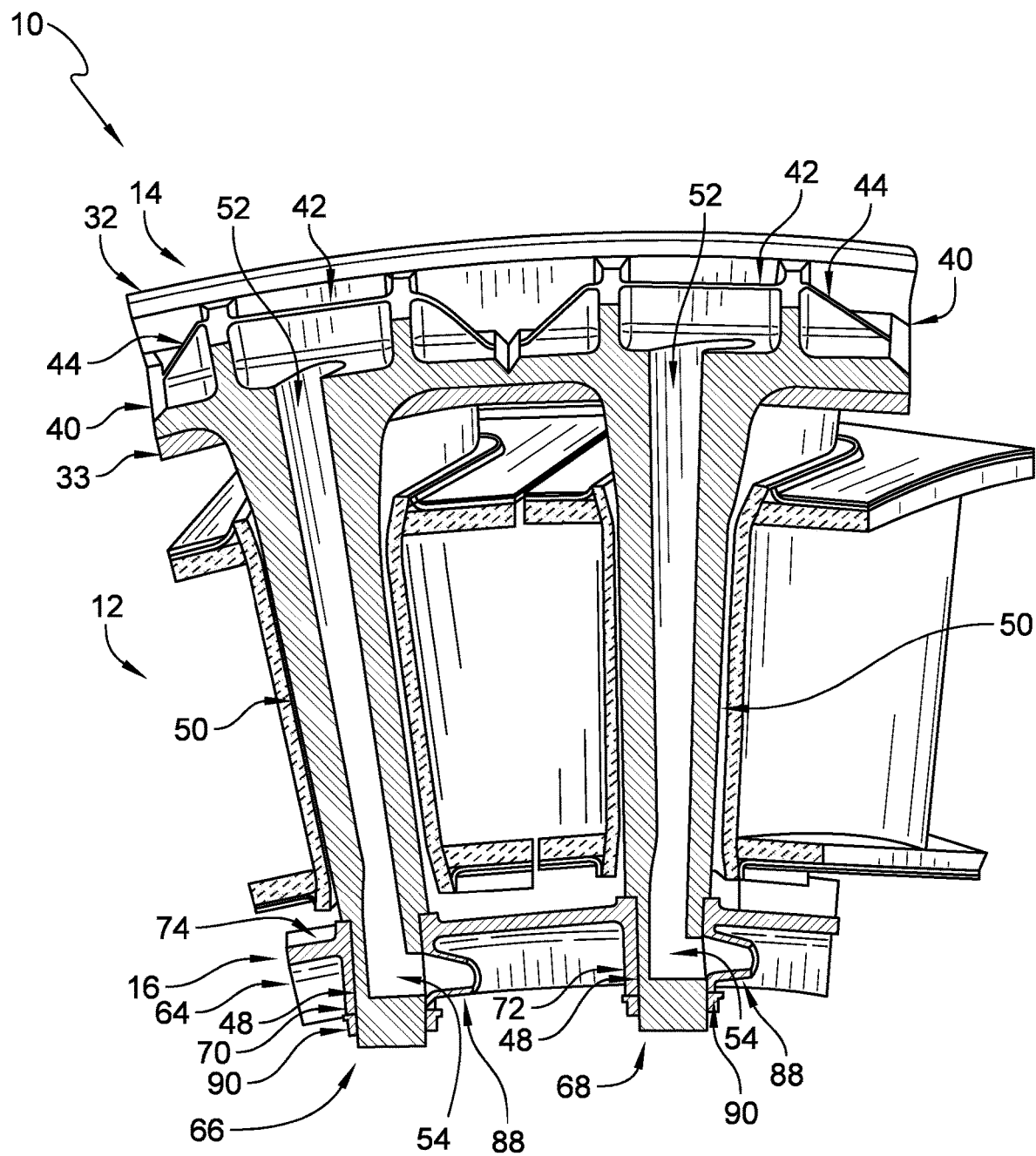
FIG. 7 is a section view of the turbine vane assembly of FIG. 4 taken along line 7-7 showing that the discrete support spars are arranged in and fastened to the full-hoop outer support ring and are each shaped to include a cooling channel that extends radially through the support spars and opens radially inward of the inner vane support.

The plurality of turbine vanes 12 are each comprised of ceramic matrix composite materials and are adapted to interact with the hot gases flowing through the gas path 18 of the gas turbine engine 110 as shown in FIGS. 2 and 3. The plurality of turbine vanes 12 are arranged entirely around the central axis 111 of the gas turbine engine 110 as shown in FIGS. 2 and 3. The plurality of turbine vanes 12 may include at least a first turbine vane 26 and a second turbine vane 28 as shown in FIGS. 4, 5, and 7. The second turbine vane 28 is spaced apart circumferentially from the first turbine vane 26. Each of the turbine vanes 26, 28 are shaped to define an interior cavity 30 that extends radially through each turbine vane 26, 28 as shown in FIG. 5.

The outer vane support 14 includes the full-hoop outer support ring 32 and a plurality of discrete support spars 36 as shown in FIGS. 2-5. The full-hoop outer support ring 32 is configured to receive force loads applied to the plurality of turbine vanes 12 by the hot gases during use of the vane assembly 10 in the gas turbine engine 110. The full-hoop outer support ring 32 is arranged radially outward of the plurality of turbine vanes 12 so as to locate the plurality of turbine vanes 12 radially between the inner vane support 16 and the full-hoop outer support ring 32. The full-hoop outer support ring 32 extends entirely circumferentially about the axis 111 and is configured to be coupled to the turbine case 20.

The full-hoop outer support ring 32 includes an annular outer mount platform 33 that extends entirely circumferentially about the central axis 111 as shown in FIGS. 4 and 5. The annular outer mount platform 33 is formed of metallic materials or any other suitable materials. The annular outer mount platform 33 is generally planar relative to an axial direction of the engine 110 and includes a radially outwardly facing surface 34. In particular, The annular outer mount platform 33 further includes a plurality of spar-receiving openings 35 formed therein that each allow for insertion and coupling of a single, discrete support spar 36. Each spar-receiving opening 35 opens axially through the annular outer mount platform 33.

Each discrete support spar 36 of the plurality of discrete support spars 36 includes a radially outer end 38, a radially inner end 48, and a strut 50 extending between and interconnecting the radially inner end 48 and the radially outer end 36 as shown in FIG. 5. The radially outer end 38 includes an outer spar platform 40 as shown in detail in FIGS. 9A-10D. The outer spar platform 40 is integrally formed with the strut 50 and the inner end 48 in the illustrative embodiment. The outer spar platform 40 is configured to provide radial support to the spar 36 when the spar 36 is mounted within the respective vane 12. In particular, the outer spar platform 40 extends away from an outer surface of the strut 50 in a circumferential direction and in an axial direction. As a result, the outer spar platform 40 forms an overhang around an entirety of the strut 50. Thus, a radially inwardly facing surface 45 of the outer spar platform 40 rests on and is coupled to the annular outer mount platform 33.

Figure 9B:
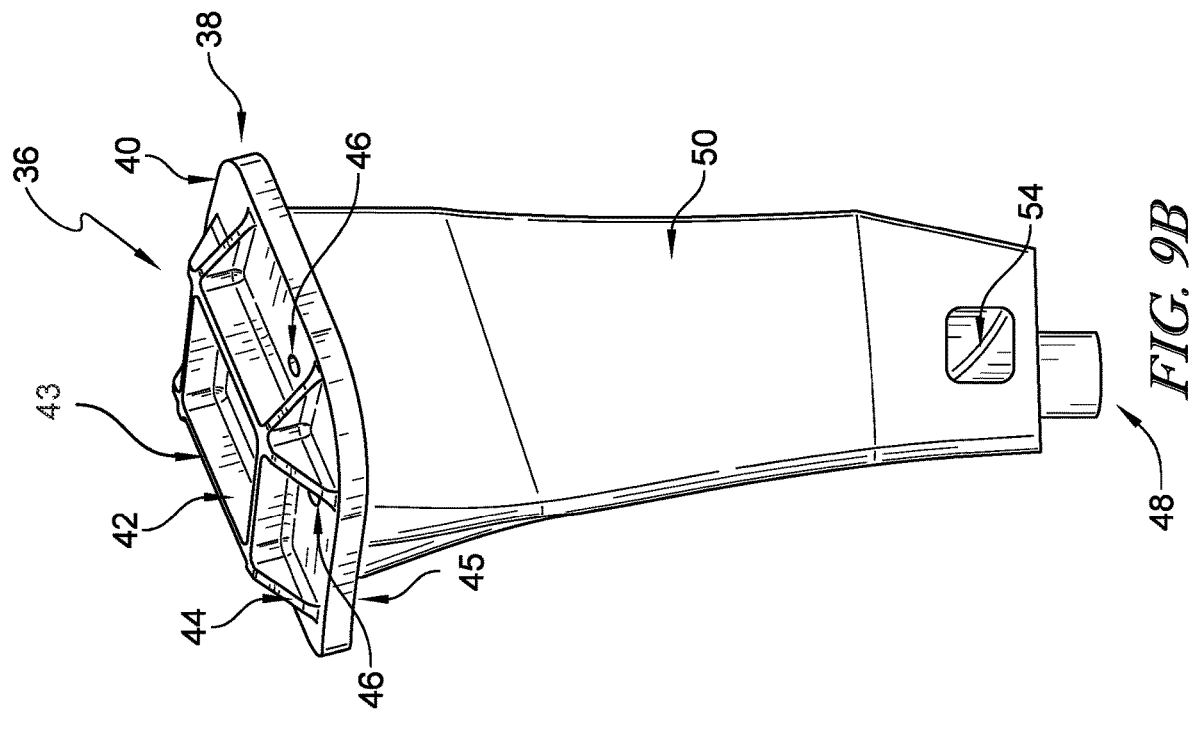
FIG. 9B is a perspective view of the discrete support spar of FIG. 9A showing that the discrete support spar includes the outer spar platform, the plurality of flat ribs, and the plurality of angled ribs, and further showing that the discrete support spar further includes a cooling air exit hole that is in fluid communication with the cooling channel and that is located at the radially inner end of the discrete support spar.
Figure 9A:
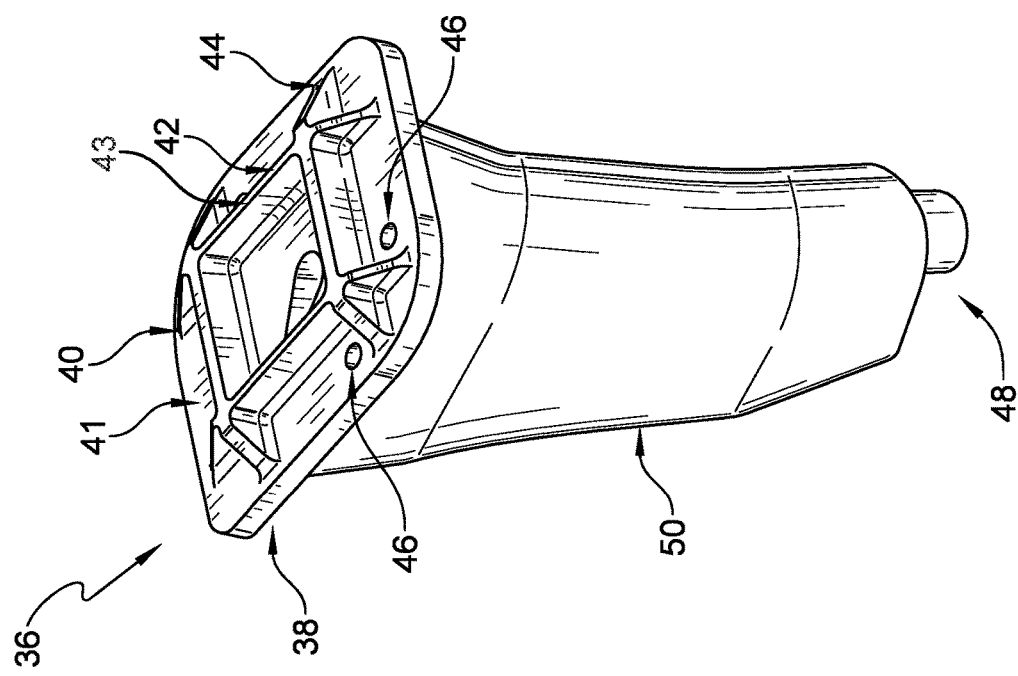
FIG. 9A is a perspective view of a discrete support spar of the plurality of support spars of the turbine vane assembly of FIG. 2 showing that the discrete support spar includes an outer end having an outer spar platform, a plurality of ribs that extend upwardly away from the outer spar platform, each rib having a central portion having a constant height and angled ends, and further showing that the discrete support spar includes an inner support plug arranged on a radially inner end of the discrete support spar.

The outer spar platform 40 of each discrete support spar 36 includes a substantially planar radially outwardly facing surface 41 and the substantially planar radially inwardly facing surface 45 as shown in FIGS. 9A and 9B. The face of each surface 41, 45 corresponds to the circumferential radius of curvature of the annular outer mount platform 33 of the full-hoop outer support ring 32 such that the radially inwardly facing surface 45 lies flush with the radially outer surface 34 of the annular outer mount platform 33.

In the illustrative embodiment, each spar-receiving opening 35 is shaped to correspond to an outer contour of an upper portion of a strut 50 of the discrete support spar 36 that is arranged in the opening 35. As a result, at least a portion of the radially inwardly facing surface 45 of the outer spar platform 40 contacts the radially outwardly facing surface 34 of the annular outer mount platform 33 of the full-hoop outer support ring 32. In other embodiments, the spar-receiving opening 35 may have a shape that differs from the outer contour of the strut 50, so long as the radially inwardly facing surface 45 of the outer spar platform 40 contacts a sufficient area of the radially outwardly facing surface 34 of the annular outer mount platform 33 so as to support the spar 36. In some embodiments, the distance between the inner edge of the spar-receiving opening 35 and the outer surface of the strut 50 is minimal such that a maximum area of the radially inwardly facing surface 45 of the outer spar platform 40 contacts the annular outer mount platform 33.

Each discrete support spar 36 extends radially inward from the full-hoop outer support ring 32 through the interior cavity 30 of a respective turbine vane 12. FIG. 4 shows a section of the full-hoop outer support ring 32 which includes the two turbine vanes 26, 28. A first discrete support spar 36 and a second discrete support spar 36 are spaced apart circumferentially from each other and extend radially inward from the full-hoop outer support ring 32 through the interior cavity 30 of the first and second turbine vanes 26, 28. In the illustrative embodiment, the general shape of the strut 50 of the support spar 36 corresponds to the interior shape of the interior cavity 30 of each vane 12. As such, the strut 50 may be coupled to an upper portion of the interior cavity 30 and a lower portion of the interior cavity 30 with minimal distance therebetween.

The outer spar platform 40 of each discrete support spar 36 further includes a plurality of reinforcing ribs 42 extending upwardly away from the outer spar platform 40 as shown in FIGS. 5, 7, 9A, and 9B. Each rib 42 of the plurality of ribs 42 includes a central portion 43 that extends along the radially outwardly facing surface 41. In the illustrative embodiment, each rib 42 further includes an angled end 44 at each terminal end of the central portion 43 that each extend away from the central portion 43 to an outer perimeter of the outer spar platform 40. The angled end 44 of each rib provides for additional stiffness to the outer portions of the outer spar platform 40 while also being comprised of minimal material, in comparison with ribs 42 that extend at a constant height to the perimeter of the outer spar platform 40.

In the illustrative embodiment, each central portion 43 of each rib 42 has a constant height along the entire extent of the central portion 43 as shown in FIGS. 9A and 9B. The plurality of reinforcement ribs 42 cooperate to reinforce the full-hoop outer support ring 32 and stiffen the outer spar platform 40, minimizing the compliance of the full-hoop outer support ring 32 and resulting deflections. Moreover, the reinforcement ribs 42 may be configured to help minimize the axial deflection of the turbine vane assembly 10. The reinforcement ribs 42 may also be configured to help minimize resulting stresses in the outer spar platform 40 due to twisting of the turbine vane assembly 10.

In the illustrative embodiment, the plurality of ribs 42 includes four ribs 42 as shown in FIGS. 9A and 9B. Two of the four ribs 42 are axially spaced apart, extend in a circumferential direction, and are parallel with each other. The other two of the four ribs 42 are circumferentially spaced apart, extend in an axial direction, and are parallel with each other. As such, the ribs form a substantially square shape that provides additional reinforcement to the outer spar platform 40.

Figure 8A:
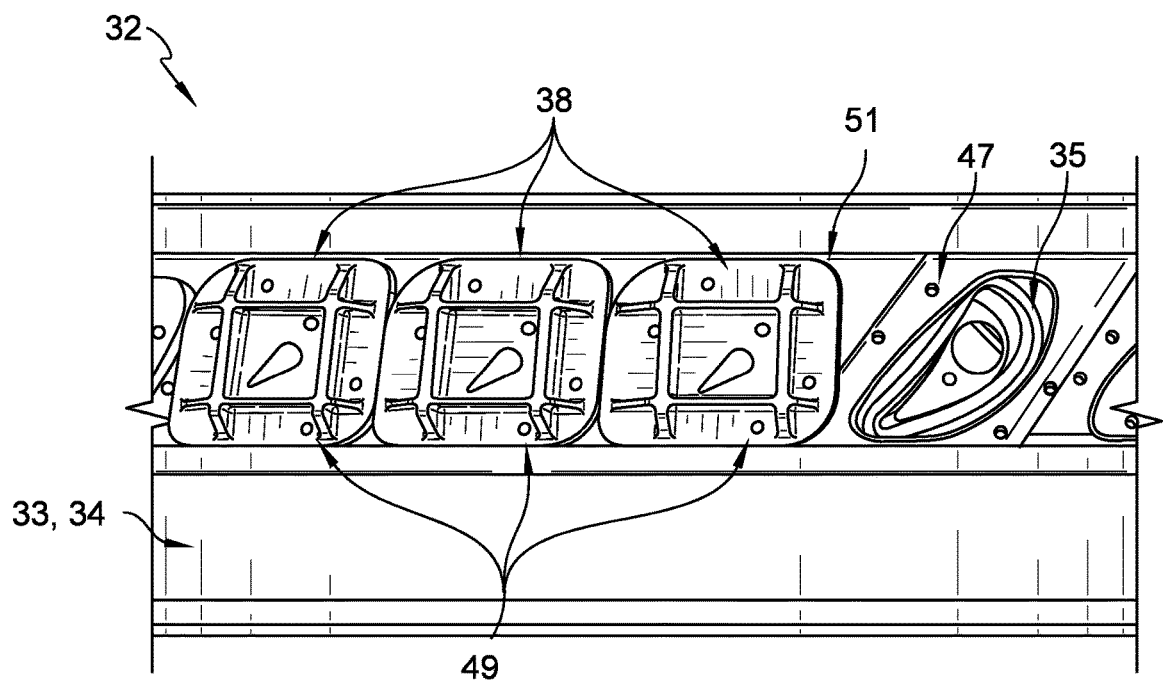
FIG. 8A is a top view of a section of the turbine vane assembly of FIG. 2 showing three discrete support spars of the plurality of support spars arranged in and fastened to the full-hoop outer support ring.
Figure 8B:
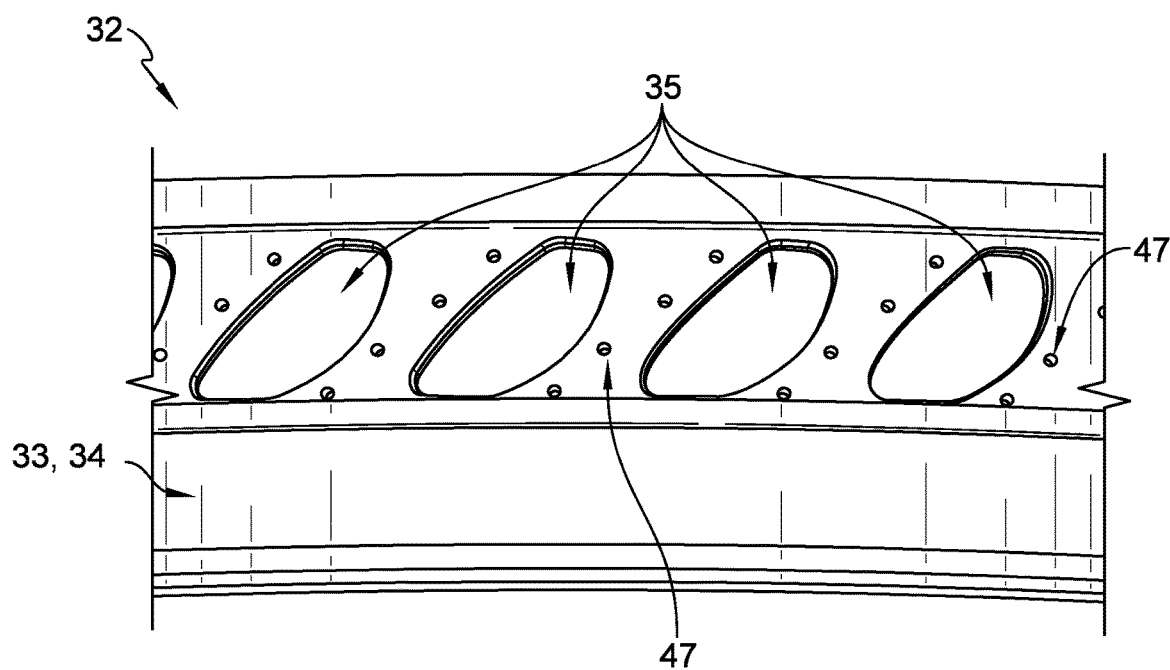
FIG. 8B is a top view of the section of the turbine vane assembly of FIG. 8A showing the full-hoop outer support ring with no discrete support spars arranged therein and showing that the full-hoop outer support ring includes spar openings shaped to correspond to the cross-sectional shape of an upper portion of the discrete support spars.

The outer support platform 40 of each discrete support spar 36 further includes a plurality of fastener holes 46 formed therein as shown in FIGS. 8A-9B, 10C, and 10D. Moreover, the annular outer mount platform 33 of the full-hoop outer support ring 32 further includes a plurality of fastener holes 47 formed therein that are aligned with the plurality of fastener holes 46 of the outer spar platform 40. A fastener 49 is arranged within each fastener hole 46, 47 of the outer spar platform 40 and the annular outer mount platform 33 so as to couple the discrete support spar 36 to the full-hoop outer support ring 32. In the illustrative embodiment, the plurality of fastener holes 46 on the outer support platform 40 includes four fasteners. Each fastener hole 46 is arranged adjacent an angled end 44 of a rib 42 and opposite of the fastener hole 46 located on the opposite side of the outer support platform 40 as shown in FIG. 8A. The areas in which the fastener holes 46 are positioned experience higher stresses due to their proximity to gas flow. Thus, the positioning of the fastener holes 46 provides for a high strength coupling of the spar 36 to the ring 32 at high stress locations. In the illustrative embodiment, the fasteners 49 are bolts, although other fastening elements suitable for coupling the spars 36 to the ring 32 are contemplated.

In the illustrative embodiment, the outer spar platform 40 of each discrete support spar 36 includes a first outer edge and a second outer edge that are axially spaced apart and extend in a circumferential direction and a third outer edge and a fourth outer edge that are circumferentially spaced apart and extend in an axial direction as shown in FIG. 8A. The first outer edge and the second outer edge are parallel with each other and the third outer edge and the fourth outer edge are parallel with each other. The third outer edge of the outer spar platform of each discrete support spar 36 circumferentially abuts the fourth outer edge of the outer support platform of an adjacent discrete support spar 36.

The outer spar platform 40 of each discrete support spar 36 further includes filets 51 on each corner of the quadrilateral outer spar platform 40 as shown in FIGS. 5, 8A, 9A, 9B, and 10D. In the illustrative embodiment, the outer spar platform 40 includes a filet 51 between the first and second outer edges, the second and third outer edges, the third and fourth outer edges, and the fourth and first outer edges. The four filets 51 of each outer spar platform 40 allow for very minor rotational play about a radially extending axis of the spar 36 between adjacent spars 36 during installation and securing of the spars 36 to the ring 32, thus allowing for compensation for minor inconsistencies in components and a more ideal fit of all components. This is particularly beneficial in maintenance scenarios in which only some components are being replaced or repaired.

Each of the discrete support spars 36 are also shaped to include a cooling channel 52 as shown in FIGS. 5 and 7. The cooling channel 52 extends radially through the support spar 36 and is configured to transmit a flow of cooling air through the turbine vane assembly 10 radially inward of the inner vane support 16. In some embodiments, the support spars 36 may also include impingement holes (not shown) that may be configured to conduct a flow of cooling air to each vane 26, 28 in the interior cavity 30.

The inner end 48 of each discrete support spar 34, 36 is shaped to include a cooling air exit hole 54 as shown in FIGS. 5, 7, and 9B. The exit hole 54 extends at least partway through the inner end 48 of the support spar 36 and is in fluid communication with the cooling channel 52 of the support spar 36. The exit hole 54 is configured to transmit the flow of cooling air to an inner cavity 56 radially inward of the inner vane support 16.

Figure 10A:
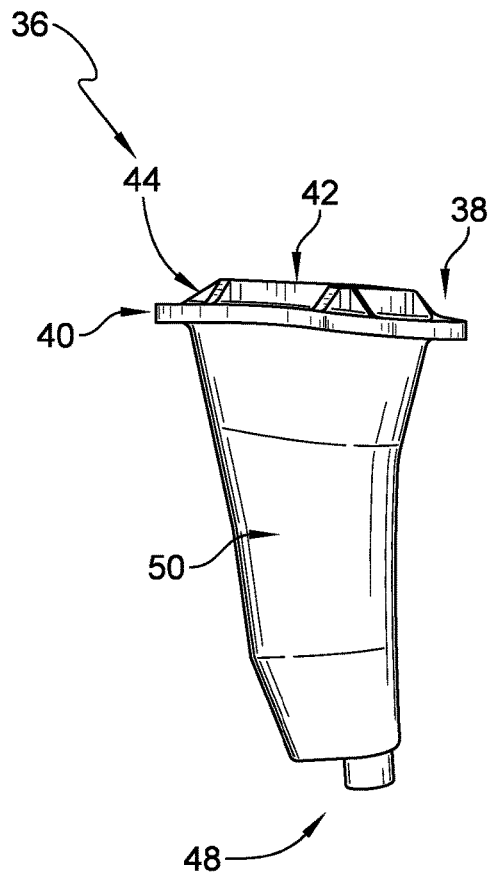
FIG. 10A is a side view of the discrete support spar of FIG. 9A showing the shape of the discrete support spar, the outer spar platform, and the inner support plug.
Figure 10B:
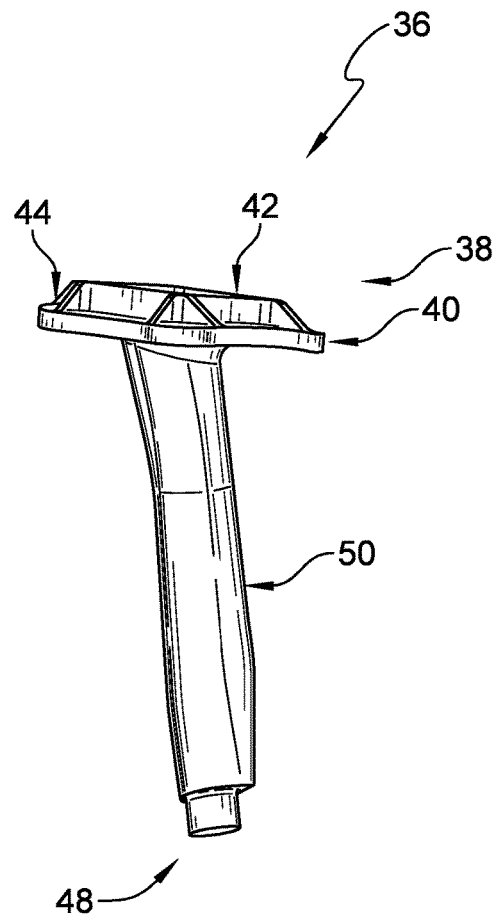
FIG. 10B is a front view of the discrete support spar of FIG. 9A showing the shape of the discrete support spar, the outer spar platform, and the inner support plug.
Figure 10C:
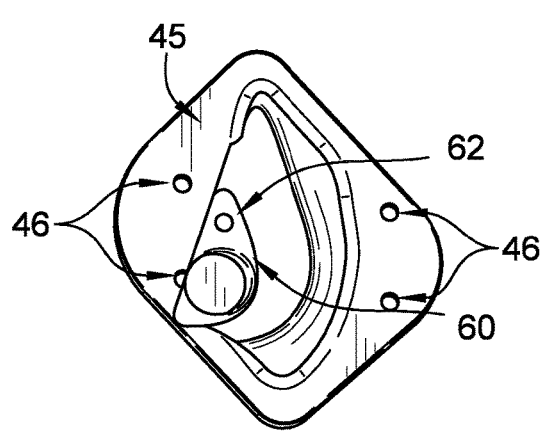
FIG. 10C is a bottom view of the discrete support spar of FIG. 9A showing the shape of the discrete support spar, the outer spar platform, and the inner support plug, and further showing that the outer spar platform includes a plurality of fastener holes through which fasteners are inserted in order to couple the discrete support spar to the full-hoop outer support ring.
Figure 10D:
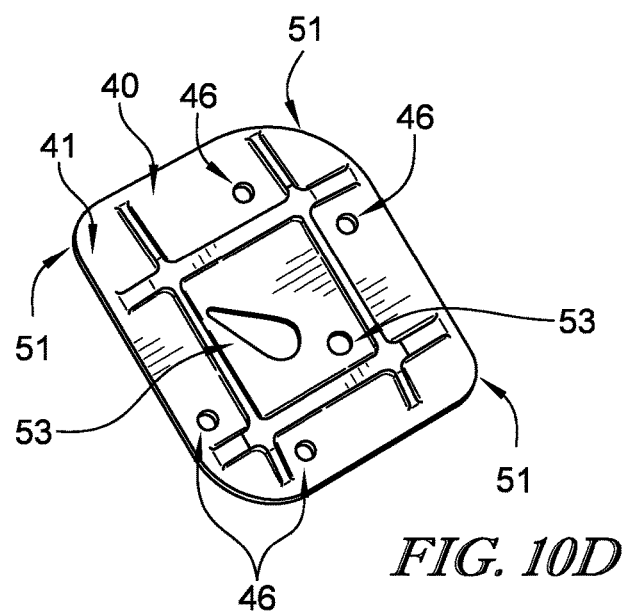
FIG. 10D is a bottom view of the discrete support spar of FIG. 9A showing the shape of the discrete support spar, the outer spar platform, and the inner support plug, and further showing that the outer spar platform includes a plurality of fastener holes through which fasteners are inserted in order to couple the discrete support spar to the full-hoop outer support ring.

The strut 50 of each support spar 36 is shaped to include inner interface surface 60 and an anti-rotation notch 62 as shown in FIG. 10C. The inner interface surface 60 is configured to engage the inner vane support 16 and block radial outward movement of the inner vane support 16 relative to the outer vane support 14. The anti-rotation notch 62 extends radially outward into inner interface surface 60 of the strut 50. The anti-rotation notch 62 is configured to mate with an anti-rotation feature 78 in the inner vane support 16 to block relative movement between the support spar 36 and the inner vane support 16 as shown in FIG. 5.

The inner vane support 16 includes an inner mount platform 64, a plurality of fasteners 66, 68, raised interface surfaces 74, and anti-rotation pegs 78 as shown in FIG. 5. The inner mount platform 64 extends at least partway about the axis 111. The inner mount platform 64 includes a raised interface surface 74 corresponding to one of the discrete support spars 36. Each raised interface surface 74 extends radially outward from the inner mount platform 64 and is configured to engage the inner interface surface 60 of the corresponding strut 50. The anti-rotation peg 78 extends radially outward from the raised interface surface 74 and into the anti-rotation notch 62 in the corresponding strut 50 to block twisting of the inner mount platform 64 relative to the support spar 36.

The inner mount platform 64 is a segment of a full circumferential hoop of an inner mount platform. As shown in FIG. 5, in the illustrative embodiment, the inner mount platform includes two raised interface surfaces 74 such that the segment corresponds to two discrete support spars 36. The inner mount platform 64 further includes two fasteners 66, 68 configured to couple a respective inner end 48 of a respective discrete support spar 36 to the inner vane support 16 to provide a mechanical linkage between the respective discrete support spars 36 and reduce twisting of the turbine vane assembly during use of the turbine vane assembly 10 in the gas turbine engine 110.

In some embodiments, the inner mount platform 64 is machined to form the raised interface surfaces 74. In other embodiments, the inner mount platform 64 may be machined so that the interface surfaces 74 extend radially into the inner mount platform 64.

In the illustrative embodiment, the anti-rotation peg 78 extends radially outward from the inner mount platform 64. In other embodiments, the anti-rotation feature arrangement may be reversed so that the anti-rotation notch 62 is machined into the inner mount platform 64 and the strut 50 of the support spar 36 includes the anti-rotation peg 78.

In operation, as hot gases are conducted through the gas path 18 of the gas turbine engine 110, the full-hoop outer support ring 32 and the discrete support spars 36 arranged around the entirety of the full-hoop outer support ring 32 prevent escape of the hot gases due to no spaces or gaps being present in the full-hoop outer support ring 32 of the outer vane support 14. As such, overall leakage of the engine 110 is reduced, and thus overall engine 110 performance is increased. Moreover, the full-hoop outer support ring 32 provides increased robustness and stiffness to the overall vane assembly 10. In addition, reduced unit cost of the full-hoop outer support ring 32 and the discrete support spars 36 may be achieved as result of simplified design parameters of the ring 32 and spars 36. Even further, life-cycle cost and maintenance efficiency are improved because, for example, individual spars 36 may be replaced as opposed to having to replace multiple spars and ring sections in the event of a single spar failure. Additionally, less cooling air may be required due to less leakages of cooling air through the full-hoop outer support ring 32.

A method according to the present disclosure is described herein. The method includes a first operation of providing a plurality of turbine vanes comprised of ceramic matrix composite materials and adapted to interact with hot gases flowing through a gas path of the gas turbine engine during use of the turbine vane assembly. The method further includes a second operation of arranging the plurality of turbine vanes around a central axis of the gas turbine engine, wherein each turbine vane of the plurality of turbine vanes is spaced apart circumferentially from an adjacent turbine vane relative to the axis, The method further includes a third operation of providing a segmented inner vane support comprised of metallic materials, arranged radially inwardly of the plurality of turbine vanes, and extending partway circumferentially about the central axis, the segmented inner vane support configured to receive force loads applied to the plurality of turbine vanes by the hot gases during use of the turbine vane assembly in the gas turbine engine. The method further includes a fourth operation of providing an outer vane support comprised of metallic materials and configured to receive force loads applied to the plurality of turbine vanes by the hot gases during use of the turbine vane assembly in the gas turbine engine, the outer vane support including a full-hoop outer support ring and a plurality of discrete support spars.

The method further includes a fifth operation of arranging the full-hoop outer support ring radially outward of the plurality of turbine vanes so as to locate the plurality of turbine vanes radially between the segmented inner vane support and the full-hoop outer support ring, the full-hoop outer support ring extending entirely circumferentially about the central axis. The method further includes a sixth operation of inserting each discrete support spar of the plurality of discrete support spars through an interior cavity of a respective turbine vane of the plurality of turbine vanes. The method further includes a seventh operation of coupling each discrete support spar to the full-hoop outer support ring such that each discrete support spar extends radially inward from the full-hoop outer support ring through the interior cavity of a respective turbine vane.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine vane assembly for use in a gas turbine engine comprises a plurality of turbine vanes comprised of ceramic matrix composite materials and adapted to interact with hot gases flowing through a gas path of the gas turbine engine, the plurality of turbine vanes arranged around an axis of the gas turbine engine, wherein each turbine vane of the plurality of turbine vanes is spaced apart circumferentially from an adjacent turbine vane included in the plurality of turbine vanes relative to the axis, a segmented inner vane support comprised of metallic materials, arranged radially inwardly of the plurality of turbine vanes, and extending partway circumferentially about the axis, the segmented inner vane support configured to receive force loads applied to the plurality of turbine vanes by the hot gases, and an outer vane support comprised of metallic materials and configured to receive force loads applied to the plurality of turbine vanes by the hot gases, the outer vane support including a full-hoop outer support ring located radially outward of the plurality of turbine vanes so as to locate the plurality of turbine vanes radially between the segmented inner vane support and the full-hoop outer support ring, the full-hoop outer support ring extending entirely circumferentially about the axis, the outer vane support further including a plurality of discrete support spars coupled to the full-hoop outer support ring and extending radially inward from the full-hoop outer support ring through an interior cavity of a respective turbine vane of the plurality of turbine vanes, wherein each discrete support spar of the plurality of discrete support spars includes a radially outer end including an outer spar platform, the outer spar platform of each discrete support spar of the plurality of discrete support spars includes a plurality of fastener holes formed therein, wherein the full-hoop outer support ring includes an annular outer mount platform extending entirely circumferentially about the axis and formed to include a plurality of fastener holes formed therein that are aligned with the plurality of fastener holes of the outer spar platform of each discrete support spar, and wherein a fastener is arranged within each fastener hole of the outer spar platform and the annular outer mount platform so as to couple the discrete support spar to the full-hoop outer support ring.

2. The turbine vane assembly of claim 1, wherein the full-hoop outer support ring includes a plurality of spar-receiving openings formed in the annular outer mount platform, wherein each spar-receiving opening of the plurality of spar-receiving openings opens axially through the annular outer mount platform, and wherein each discrete support spar of the plurality of discrete support spars is arranged within a respective spar-receiving opening of the plurality of spar-receiving openings.

3. The turbine vane assembly of claim 2, wherein each discrete support spar of the plurality of discrete support spars includes a radially inner end, the radially outer end, and a strut extending between and interconnecting the radially inner end and the radially outer end, the radially outer end including the outer spar platform.

4. The turbine vane assembly of claim 3, wherein the outer spar platform of each discrete support spar of the plurality of discrete support spars extends away from an outer surface of the strut in a circumferential direction and in an axial direction so as to form an overhang around an entirety of the strut.

5. The turbine vane assembly of claim 4, wherein each spar-receiving opening of the plurality of spar-receiving openings is shaped to correspond to an outer contour of an upper portion of the strut of a respective discrete support spar of the plurality of discrete support spars such that at least a portion of a radially inwardly facing surface of the outer spar platform contacts a radially outwardly facing surface of the annular outer mount platform of the full-hoop outer support ring.

6. The turbine vane assembly of claim 5, wherein the inner vane support includes an inner mount platform extending partway circumferentially about the axis and including at least two raised interface surfaces extending radially outward from the inner mount platform and engaging at least two respective discrete support spars of the plurality of discrete support spars to block radial movement of the inner mount relative to the outer vane support.

7. The turbine vane assembly of claim 6, wherein the inner vane support further includes at least two fasteners configured to couple a respective inner end of a respective discrete support spar of the plurality of discrete support spars to the inner mount to provide a mechanical linkage between the at least two respective discrete support spars and reduce twisting of the turbine vane assembly.

8. The turbine vane assembly of claim 4, wherein the outer spar platform of each discrete support spar of the plurality of discrete support spars includes a first outer edge and a second outer edge that are axially spaced apart and extend in the circumferential direction and a third outer edge and a fourth outer edge that are circumferentially spaced apart and extend in the axial direction, wherein the first outer edge and the second outer edge are parallel with each other, wherein the third outer edge and the fourth outer edge are parallel with each other, and wherein the third outer edge of the outer spar platform of each discrete support spar circumferentially abuts the fourth outer edge of the outer spar platform of an adjacent discrete support spar.

9. The turbine vane assembly of claim 3, wherein the outer spar platform of each discrete support spar of the plurality of discrete support spars includes a radially outwardly facing surface and a radially inwardly facing surface that each correspond to a circumferential radius of curvature of the annular outer mount platform of the full-hoop outer support ring such that the radially inwardly facing surface is flush with a radially outwardly facing surface of the annular outer mount platform.

10. The turbine vane assembly of claim 9, wherein the outer spar platform of each discrete support spar of the plurality of discrete support spars further includes a plurality of ribs extending upwardly away from the outer spar platform, each rib of the plurality of ribs including a central portion having a constant height and angled ends that extend away from the central portion to an outer perimeter of the outer spar platform.

11. The turbine vane assembly of claim 10, wherein the plurality of ribs includes a first rib and a second rib that are axially spaced apart and extend in a circumferential direction and a third rib and a fourth rib that are circumferentially spaced apart and extend in an axial direction.

12. The turbine vane assembly of claim 11, wherein the first rib and the second rib are parallel with each other, and wherein the third rib and the fourth rib are parallel with each other.

13. A turbine vane assembly for use in a gas turbine engine comprises a plurality of turbine vanes arranged around a central axis of the gas turbine engine, an inner vane support arranged radially inwardly of the plurality of turbine vanes and extending circumferentially about the central axis, and an outer vane support including a full-hoop outer support ring located radially outward of the plurality of turbine vanes so as to locate the plurality of turbine vanes radially between the inner vane support and the full-hoop outer support ring, the full-hoop outer support ring extending entirely circumferentially about the central axis, the outer vane support further including a plurality of discrete support spars coupled to the full-hoop outer support ring and extending radially inward from the full-hoop outer support ring through an interior cavity of a respective turbine vane of the plurality of turbine vanes, wherein the full-hoop outer support ring includes an annular outer mount platform extending entirely circumferentially about the central axis and defining a radially outwardly facing surface, wherein each discrete support spar of the plurality of discrete support spars includes a radially outer end including an outer spar platform and at least a portion of a radially inwardly facing surface of the outer spar platform lies on top of and flush with the radially outwardly facing surface of the annular outer mount platform of the full-hoop outer support ring, and wherein the outer spar platform of each discrete support spar of the plurality of discrete support spars includes a plurality of fastener holes formed therein, wherein the annular outer mount platform of the full-hoop outer support ring includes a plurality of fastener holes formed therein that are aligned with the plurality of fastener holes of the outer spar platform of each discrete support spar, and wherein a fastener is arranged within each fastener hole of the outer spar platform and the annular outer mount platform so as to couple the discrete support spar to the full-hoop outer support ring.

14. The turbine vane assembly of claim 13, wherein the full-hoop outer support ring includes a plurality of spar-receiving openings formed in the annular outer mount platform, wherein each spar-receiving opening of the plurality of spar-receiving openings opens axially through the annular outer mount platform, and wherein each discrete support spar of the plurality of discrete support spars is arranged within a respective spar-receiving opening of the plurality of spar-receiving openings.

15. The turbine vane assembly of claim 14, wherein each discrete support spar of the plurality of discrete support spars includes a radially inner end, the radially outer end, and a strut extending between and interconnecting the radially inner end and the radially outer end, the radially outer end including the outer spar platform.

16. The turbine vane assembly of claim 15, wherein the outer spar platform of each discrete support spar of the plurality of discrete support spars extends away from an outer surface of the strut in a circumferential direction and in an axial direction so as to form an overhang around an entirety of the strut.

17. The turbine vane assembly of claim 16, wherein each spar-receiving opening of the plurality of spar-receiving openings is shaped to correspond to an outer contour of an upper portion of the strut of a respective discrete support spar of the plurality of discrete support spars such that at least a portion of the radially inwardly facing surface of the outer spar platform contacts the radially outwardly facing surface of the annular outer mount platform of the full-hoop outer support ring.

18. A turbine vane assembly for use in a gas turbine engine comprises:
a plurality of turbine vanes comprised of ceramic matrix composite materials and adapted to interact with hot gases flowing through a gas path of the gas turbine engine, the plurality of turbine vanes arranged around an axis of the gas turbine engine, wherein each turbine vane of the plurality of turbine vanes is spaced apart circumferentially from an adjacent turbine vane included in the plurality of turbine vanes relative to the axis,
a segmented inner vane support comprised of metallic materials, arranged radially inwardly of the plurality of turbine vanes, and extending partway circumferentially about the axis, the segmented inner vane support configured to receive force loads applied to the plurality of turbine vanes by the hot gases, and
an outer vane support comprised of metallic materials and configured to receive force loads applied to the plurality of turbine vanes by the hot gases, the outer vane support including a full-hoop outer support ring located radially outward of the plurality of turbine vanes so as to locate the plurality of turbine vanes radially between the segmented inner vane support and the full-hoop outer support ring, the full-hoop outer support ring extending entirely circumferentially about the axis, the outer vane support further including a plurality of discrete support spars coupled to the full-hoop outer support ring and extending radially inward from the full-hoop outer support ring through an interior cavity of a respective turbine vane of the plurality of turbine vanes,
wherein the full-hoop outer support ring includes an annular outer mount platform extending entirely circumferentially about the axis and a plurality of spar-receiving openings formed in the annular outer mount platform, wherein each spar-receiving opening of the plurality of spar-receiving openings opens axially through the annular outer mount platform, and wherein each discrete support spar of the plurality of discrete support spars is arranged within a respective spar-receiving opening of the plurality of spar-receiving openings,
wherein each discrete support spar of the plurality of discrete support spars includes a radially inner end, a radially outer end, and a strut extending between and interconnecting the radially inner end and the radially outer end, the radially outer end including an outer spar platform,
wherein the outer spar platform of each discrete support spar of the plurality of discrete support spars includes a radially outwardly facing surface and a radially inwardly facing surface that each correspond to a circumferential radius of curvature of the annular outer mount platform of the full-hoop outer support ring such that the radially inwardly facing surface is flush with a radially outwardly facing surface of the annular outer mount platform,
wherein the outer spar platform of each discrete support spar of the plurality of discrete support spars further includes a plurality of ribs extending upwardly away from the outer spar platform, each rib of the plurality of ribs including a central portion having a constant height and angled ends that extend away from the central portion to an outer perimeter of the outer spar platform,
wherein the plurality of ribs includes a first rib and a second rib that are axially spaced apart and extend in a circumferential direction and a third rib and a fourth rib that are circumferentially spaced apart and extend in an axial direction,
wherein the first rib and the second rib are parallel with each other, and wherein the third rib and the fourth rib are parallel with each other, and
wherein the outer spar platform of each discrete support spar of the plurality of discrete support spars further includes a plurality of fastener holes formed therein, wherein the annular outer mount platform of the full-hoop outer support ring further includes a plurality of fastener holes formed therein that are aligned with the plurality of fastener holes of the outer spar platform of each discrete support spar, and wherein a fastener is arranged within each fastener hole of the outer spar platform and the annular outer mount platform so as to couple the discrete support spar to the full-hoop outer support ring.

* * * * *